INVENTORS
JOHN L. BOTJER
EDWARD O. DONNER
HAROLD E. FRYE
HOWARD S. KEELER
BY
Thomas & Thomas
ATTORNEYS Feb. 24, 1970 J. L. BOTJER ET AL 3,497,613

DISPLAY DEVICE WITH VIDEO SIGNALS INTERLEAVED IN SEGMENTS OF A CYCLICAL STORAGE

Filed March 25, 1966 5 Sheets-Sheet 2

United States Patent Office 3,497,613

Patented Feb. 24, 1970

3,497,613

DISPLAY DEVICE WITH VIDEO SIGNALS INTERLEAVED IN SEGMENTS OF A CYCLICAL STORAGE

John L. Botjer, Hyde Park, Edward O. Donner, Poughkeepsie, and Harold E. Frye and Howard S. Keeler, Wappingers Falls, N.Y., assignors to International Business Machines Corporation, Armonk, N.Y., a corporation of New York Filed Mar. 25, 1966, Ser. No. 537,524

Int. Cl. H04n 5/04

U.S. Cl. 178—6.8 4 Claims

ABSTRACT OF THE DISCLOSURE

A display system including a delay line buffer coupled to a television type display device, control means coupled to the delay line buffer and the display device for synchronizing video signals in the buffer with a sweep pattern for the display device. The line trace time of the display device is made equal to the line retrace time, and video information for each line of the trace is stored in interleaved time segments in the delay line buffer with each such time segment having a time duration equal to the line trace time of the displace device, whereby one frame is generated for the display device for each two full cycles of the delay line buffer.

CROSS-REFERENCES TO RELATED APPLICATIONS

Applications 487,887 for Delay Line Buffer Storage Circuit filed Sept. 16, 1965 by John L. Botjer et al, now Patent No. 3,413,615.

Application Ser. No. 512,106, Improved Display System filed Dec. 7, 1965 by John L. Botjer et al.

Application Ser. No. 517,334, Display Device With Synchronized Video And BCD Date In A Cyclical Storage filed Dec. 29, 1965 by John L. Botjer et al. now Patent No. 3,413,610.

BACKGROUND OF THE INVENTION

Field of the invention

This invention relates to display devices and more particularly to such devices employed in terminal equipment associated with data processing systems.

Each of the various types of known display arrangements for visually presenting characters and symbols, selected at will, to form a massage, chart or other type of data display is quit complex and accordingly expensive. The need exists for an inexpensive display arrangement which is flexible and adaptable to varied uses and which is simple to operate and maintain.

SUMMARY OF THE INVENTION

It is a feature of this invention to provide a display arrangement which is efficient in operation and which is relatively inexpensive to manufacture and maintain.

It is a feature of this invention to provide a display arrangement wherein a television type display device is used in conjunction with a cyclical storage device, and the period of the cyclical storage device is a submultiple of the time period of one television picture frame which time period includes the display portion of the picture frame as well as the retrace portion.

It is a feature of this invention to provide a television type display device in conjunction with a cyclical storage device which is synchronized with a television raster, and video information for each line of the television display is interleaved or stored in alternate time segments of the cyclical storage device. As one pass or cycle is made by the cyclical storage device alternate time segments supply video information to the television display device for generating one portion of the TV picture, such as the upper portion, for example. On the next pass or cycle of the cyclical storage device the remaining alternate time segments supply video signals to the television display device to generate the remaining part of the televison picture, such as the lower portion, for example. The horizontal blanked and unblanked portions of the television sweep are made equal in time duration, and the number of time segments or blocks in the cyclical storage device is made equal to an odd integer. This assures that alternate time segments or blocks of the cyclical storage device not displayed in the first pass or cycle of the cyclical storage device will be presented for display in the second pass or cycle of the cyclical storage device. More specifically, the use of an odd number of time segments or blocks in the cyclical storage device insures that precessing takes place. Interleaving in alternate time segments or blocks of the cyclical storage device requires two sweeps or cycles to display all such time segments or blocks. All time segments or blocks of the cyclical storage device are made equal in time duration, and this time duration is made equal to the time period of one trace of the television sweep. The result is a more efficient utilization of the storage capacity of the cyclical storage device because all time segments or blocks of the cyclical storage device may be filled with video information, one half of which is displayed in one cycle with the remaining half being displayed in the second cycle of the cyclical storage device. However, since vertical retrace of the display device occurs in the second cycle or pass of the cyclical storage device, one half of the time segments of the cyclical storage device which occur during vertical retrace cannot be used for storing video information, and binary digital information, such as a binary coded decimal form, may be stored in the alternate time segments or blocks of the cyclical storage device during vertical retrace of the display device. Thus it is seen that maximum storage capacity of the cyclical storage device is utilized.

It is a further feature of this invention to provide a display arrangement including a display device having a cyclical moving trace, a buffer store accessible in synchronism with the pattern of movement of the trace, means for storing intensity modulation information in the buffer store for controlling the image produced by the trace, and means to supply intensity modulation information from alternate time segments of the buffer store to the cyclical moving trace, and means for storing other information in alternate segments of the buffer store during the vertical retrace portion of the cyclical moving trace thereby to obtain optimum use of the storage capacity of the buffer store.

In one arrangement according to the present invention an improved display arrangement is provided wherein parallel binary coded data signals from an input device, such as a keyboard, are converted to video signals by a composer and to binary coded decimal signals in serial form by a parallel-serial converter. Video signals are stored in alternate time segments or blocks of a cyclical delay line buffer during either the first or second cycle or pass of the cyclical delay line buffer. Binary coded decimal signals are stored in alternate time segments or blocks of the cyclical delay line buffer during the vertical retrace portion of a television type display device. The cyclical delay line buffer has its output connected to the television type display device. The time period of one pass through the cyclical delay line buffer is equal to a submultiple of the time required to generate one television frame, including the display time and the vertical retrace time. All video information is presented to and displayed by the television type display device after two cycles or passes of the cyclical delay line buffer. The video signals generate on the face of the television display tube information typed at the keyboard. The binary coded decimal signals may be read from the cyclical delay line buffer and transmitted to a load device such as a data processing system. Thus a message may be typed, displayed, verified and then transmitted to a load device. Typing errors as well as other types of errors may be detected visually and corrected or deleted at will.

It is a further feature of this invention to provide an improved display device which uses a cyclical recirculating delay line buffer to store video signals which are cyclically supplied to a television type display device. The recirculating delay line buffer preferably uses four delay lines in parallel to supply dot raster display information at four times the basic bit rate of one such delay line. The video signals for the lines of the display device are stored in adjacent odd and even sectors or blocks of the recirculating delay line buffer in an interlaced sequence. The horizontal lines for the upper half of the television display field may occupy the odd sectors or blocks of the recirculating delay line buffer, and the horizontal lines for the lower half of the television display may occupy the even sectors or blocks of the recirculating delay line storage buffer. During the generation of the upper half of the television display the delay line buffer makes one pass or cycle during which the odd sectors or blocks of the recirculating delay line buffer coincide with unblanked display intervals, and the even sectors or blocks coincide with blanked segments of the display. During the generation of the lower half of the television display the delay line buffer makes another pass or cycle during which the even sectors or blocks of the recirculating delay line buffer coincide with unblanked display intervals, and the odd sectors or blocks coincide with blanked segments of the display. Thus the maximum storage capacity of the recirculating delay line is efficiently utilized.

It is another feature of this invention to provide an improved display arrangement which includes video signals for display lines interleaved in discrete sectors or blocks of a cyclical storage device which is synchronized with blanked and unblanked segments of a raster for a television type display device whereby optimum use of the storage capacity of the recirculating buffer storage devices is obtained.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGURES 2 through 8A and 8B illustrate the manner in which the displays are generated on the face of the display device in FIGURE 1, and these figures are useful in displaying the format of information stored in the delay line buffer in FIGURE 1.

DESCRIPTION OF THE PREFERRED EMBODIMENT

Figure 1:
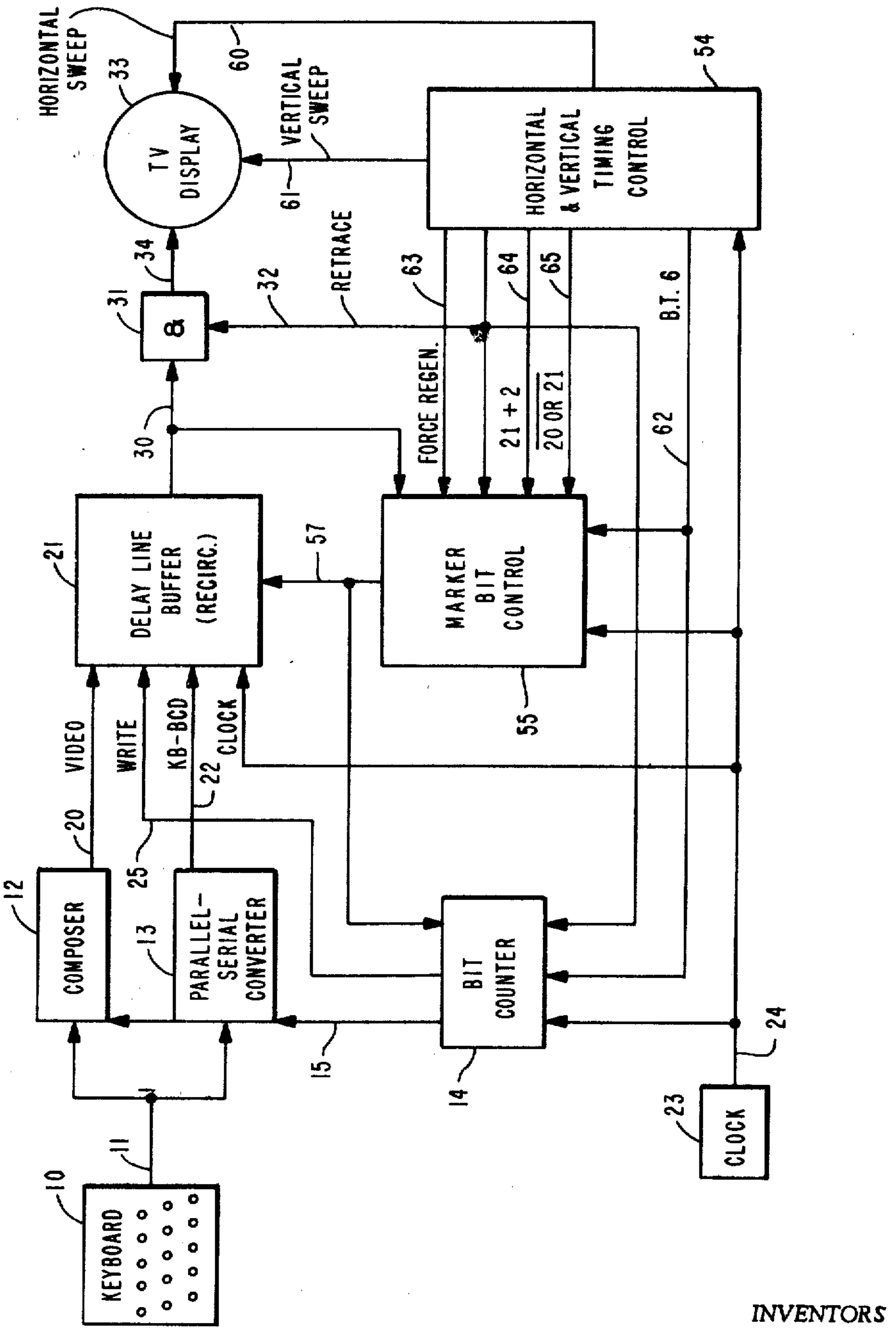
FIGURE 1 is a general block diagram illustrating a preferred embodiment of the invention.

It is arbitrarily assumed for purposes of illustration that positive logic is employed unless indicated otherwise. That is, the logic circuits such as And and Or circuits, for example, are opearted by positive signal levels at the input to provide a positive signal level at the output. The general block diagram arrangement of a preferred embodiment of the invention is illustrated in FIGURE 1, and it is described with respect to the manner in which the various circuit components or blocks are interconnected and the overall operation performed by these components or blocks. The description of the general arrangement is followed by separate and detailed descriptions of the various components or blocks where it is so required, and reference is made to copending applications in some instances in order to simplify the description herein. Bold face character symbols appearing within a block identify the common name for the circuit represented e.g. A for an And circuit.

Reference is made to FIGURE 1 which illustrates in block form a system arrangement according to this invention. A keyboard 10 supplies binary coded signals along a cable 11 to a composer 12 and a parallel-serial converter 13. Timed control signals for operating the composer 12 and the parallel-serial converter 13 are supplied by a bit counter 14 along a cable 15. The composer 12 responds to the binary coded signal at its input and supplies a serial train of video signals along a conductor 20 to a delay line buffer 21. The parallel-serial converter 13 reponds to the binary coded signals at it's input to provide a serial train of binary coded singals on a line 22 to the delay line buffer 21. A clock 23 supplies pulses on a line 24 to the various component devices including the delay line buffer 21. A write line 25 is energized with a positive signal whenever video or binary coded decimal signals are to be stored in the delay line buffer 21. Signals at the output of the delay line buffer 21 are supplied on a line 30 to an And circuit 31. This And circuit receives a positive signal on a line 32 at all times except during horizontal or vertical retrace of the TV display 33. That is, a positive signal level is supplied on the line 32 to the And circuit 31 whenever the TV display 33 is to be unblanked, and video signals from the delay line buffer 21 are supplied on the line 30 through the And circuit 31 to the TV display during such times. The And circuit 31 receives a negative signal level on the control line 32 during the horizontal or vertical retrace time of the TV display 33, and this prevents the signals on the line 30 from being supplied to the TV display 33.

A horizontal and vertical timing control 54 supplies horizontal sweep signals on a line 60 to the TV display 33, and it supplies vertical sweep signals on a line 61 to the TV display 33. The timing for these sweep signals is controlled by the clock 23 which supplies clock pulses on the line 24 to the horizontal and vertical timing control 54. The blank and unblank signals are supplied by the horizontal and vertical timing control 54 on the line 32 to the And circuit 31, and the output of this And circuit is supplied on a line 34 to the TV display 33. A timing pulse a bit time 6 (B. T. 6) is supplied by the horizontal and vertical timing control 54 on a line 62 to the bit counter 14 to synchronize its operation for writing purposes. The timing pulse on the line 62 is supplied also to a marker bit control 55 to synchronize its operation. The marker bit control 55 receives timed control signals on lines 63 through 65. The marker bit control 55 supplies a control signal on an output line 57 for initiating operation of the bit counter 14 when information from the composer or parallel-serial converter is to be written in the delay line buffer 21. The control signal on the line 55 also removes marker bits in the delay line buffer 21 prior to a writing operation.

Figures 2, 3, 4, 5:
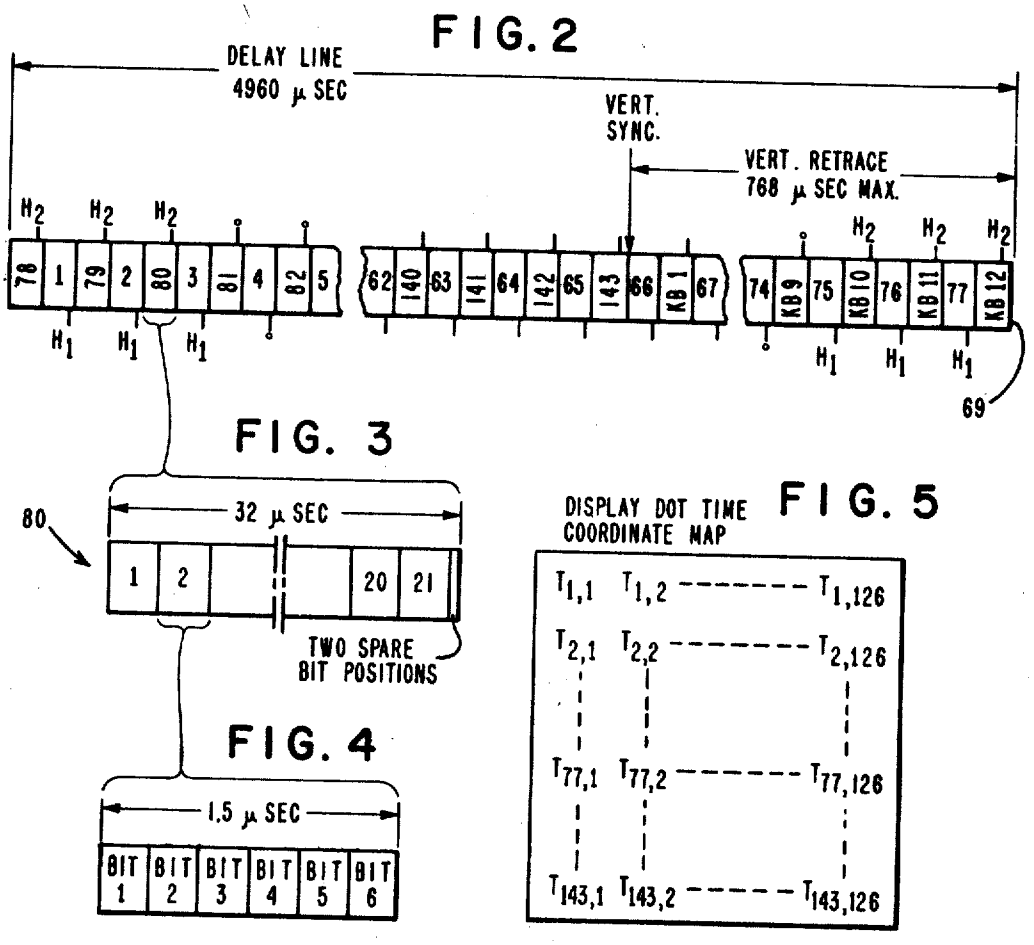

Reference is made to FIGURES 2 through 7 for a discussion of the timing aspects of the TV display 33 in FIGURE 1. In one arrangement constructed according to this invention the length of the delay line buffer 21 in FIGURE 1 was made 4960 microseconds long. A retrace at the end of the last horizontal line was eliminated, and vertical retrace was started at this point in time. The delay line cycle is depicted at 69 in FIGURE 2 with a vertical retrace portion which is 768 microseconds in duration and a display portion which is 4192 microseconds in duration, providing a combined duration of 4960 microseconds for the total delay line. The delay line in FIGURE 2 is arbitrarily divided into blocks which are numbered through 143 and KB1 through KB12. These blocks are interleaved as shown, and the delay line is circulated twice in order to retrieve all of the information stored therein. During one cycle of the delay line blocks 1 through 77 may be retrieved, and during another cycle blocks 78 through 143 and KB1 through KB12 may be retrieved. Each block in FIGURE 1 includes a horizontal synchronizing signal. The blocks 1 through 77 include horizontal synchronizing signals which are designated H1, and they are used when blocks 78 through 143 and KB1 through KB12 are retrieved. The blocks 78 through 143 and KB1 through KB12 include a synchronizing signal H2 which is used whenever blocks 1 through 78 are retrieved. In essence the synchronizing signal used by any one block is stored in the last bit position of the preceding block. Video information in digital form is stored in the blocks 1 through 143, and keyboard data in binary coded digital form is stored in the blocks KB1 through KB12. Symbols, characters and other information may be pictorially repersented on the face of the TV display by the video information stored in the delay line. Each of the blocks 1 through 143 in FIGURE 2 stores video signals for one horizontal sweep. One such horizontal sweep for the block 80 in FIGURE 2 is shown in detail in FIGURE 3 as including 21 bytes plus two spare bits. Byte 2 in FIGURE 3 is illustrated in detail in FIGURE 4 as including six bits with a total time duration of 1.5 microseconds. Thus the block 80 in FIGURE 3 has a time duration of 32 microseconds which includes 21 bytes of 1.5 microseconds duration each and two spare bits of 0.25 microsecond each.

A display dot time coordinate map for the face of the TV display is illustrated in FIGURE 5. The time for displaying the first on the first dot on the first line is designated T1, 1, and subsequent dots are successively displayed to the right until the last dot time for line 1 which is designated T1, 126. There are a total of 128 dot times per line of the TV display of which 126 dots may be displayed, and there are a total of 143 lines per frame as depicted in FIGURE 5.

Figure 6:
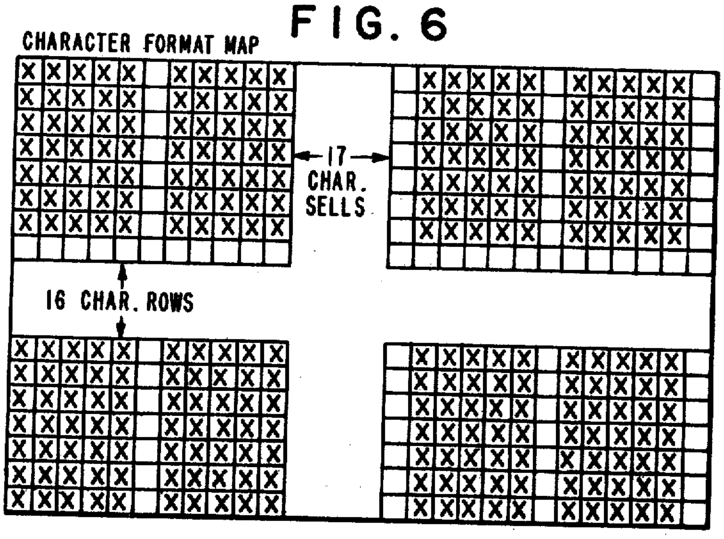

FIGURE 6 illustrates the character format for the TV display. It includes a matrix which is 21 character cells wide and 18 character cells high. Stated alternatively, there are 18 character rows with 21 characters per character row. Each character cell constitutes a matrix which is 6 bits wide and 8 bits high. Five of the six horizontal bits may be used for video display, and the sixth bit serves as a marker bit which is removed when the next character is stored adjacent thereto, thereby providing horizontal spacing between adjacent characters. A blank horizontal line is provided between rows of characters for vertically spacing the characters. This is accomplished by leaving blank the eighth vertical bit in each column of each character cell. A total of 18 times 21 or 378 characters may be displayed on the face of the TV tube.

Figure 7:
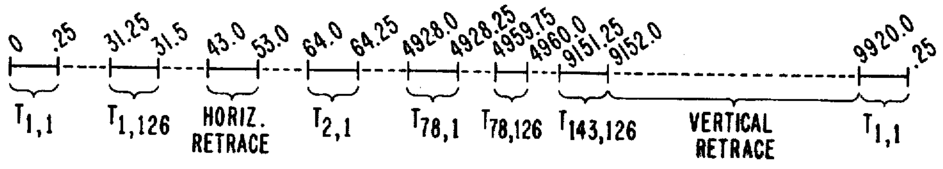

FIGURE 7 depicts the relationship between the delay line length, the dot time coordinates of the display, the horizontal sweeps and the vertical retrace which constitue one frame. This diagram is helpful in coordinating the relationships outlined in FIGURES 2 through 6. This diagram is also helpful in correlating the relationship of the electron beam as it cycles through the character format in FIGURE 6, including horizontal and vertical retrace, with events in the delay line as illustrated in FIGURES 2 through 4. It is pointed out that in FIGURE 7 the vertical retrace commences at the time of 9152 microseconds of the second cycle of the delay line and continues until 9920 microseconds which is the end of the second cycle of the delay line and the beginning of the first cycle of the next two-cycle data retrieval operation. The timed duration of the vertical retrace period is 24 horizontal lines (32×24) or 768 microseconds. Vertical retrace starts at a point in time where the horizontal retrace commences in the 143 horizontal line since the horizontal retrace is not required in the last line of the video display.

Figures 8A, 8B:
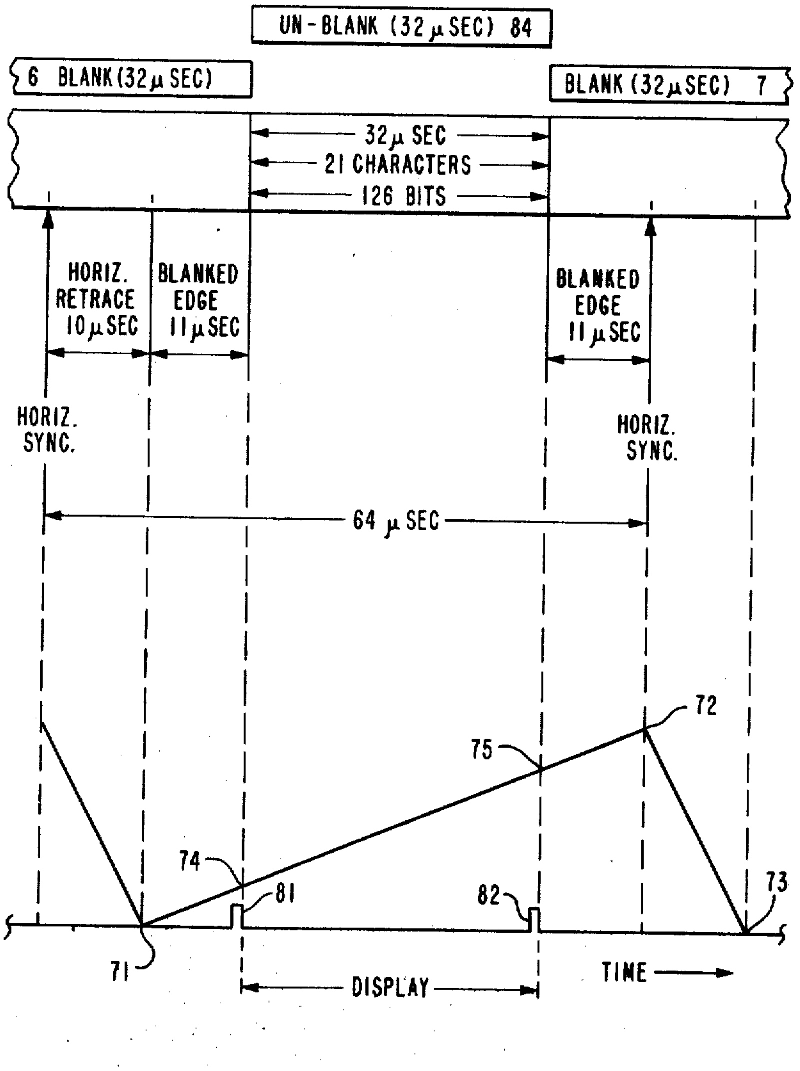

In order to illustrate the manner in which the blocks in FIGURE 2 are employed for display purposes, reference is made to FIGURES 8A and 8B. FIGURE 8A illustrates how the alternate blocks are displayed and the remaining alternate blocks are blanked in a delay line cycle. Blocks 6, 84 and 7 in FIGURE 2 are arbitrarily used in FIGURE 8A. Blocks 6 and 7 are shown as being blanked during the cycle when the block 84 is being displayed. FIGURE 8B shows the horizotal sweep signal in the form of a sawtooth wave. It commences at a time designated by a point 71 in FIGURE 8B, and it continues to sweep until a point 72 is reached at which time retrace occurs between the points 72 and 73. The horizontal sweep continues to repeat this cycle. The TV display is blanked between the time the horizontal sweep travels from point 71 to point 74, and the TV display is unblanked when the horizontal sweep travels between the points 74 and 75. During the time between the points 74 and 75 video information in the block 84 in FIGURE 8A is displayed on the face of the TV display. The TV display is blanked between the time designated by the point 75 of one cycle and the point 74 of the succeeding cycle. Initial marker bits or synchronizing signals 81 and 82 are disposed in the last bit position of respective blocks 6 and 84, and they are used for synchronizing purposes as explained more fully hereinafter. There are 64 microseconds per horizontal sweep as shown in FIGURE 8B. This time period includes 32 microseconds for displaying the video information in the blocks 84 and 32 microseconds for blanking the left and right portions of the TV display tube and for performing horizontal retrace. On the next delay line cycle the blocks 6 and 7 in FIGURE 8A are displayed and the block 84 is blanked. It is readily seen from the foregoing that the blocks 1 through 77, interleaved or disposed in alternate segments of the delay line 69 in FIGURE 2, are displayed as consecutive horizontal lines 1 through 77 in FIGURE 5, which constitutes the upper portion of the TV display in FIGURE 5, during one cycle of the delay line. The remaining alternate blocks 78 through 143 of the delay line 69 in FIGURE 2 are presented to the TV display in FIGURE 5 during the second cycle of the delay line. It is pointed out that the video information is stored in interleaved fashion in the delay line in FIGURE 2, but when presented to and displayed on the face of the TV display in FIGURE 5, the horizontal lines which generate a frame are not interleaved. From the foregoing description of FIGURES 2 through 8 it is readily seen how the display on the face of the TV tube is generated and how the information stored in the delay line is synchronized with the display tube. The pictorial representation on the TV display may include letters, numbers, special characters and other types of information.

The keyboard 10 in FIGURE 1, the composer 12, the parallel-serial converter 13 and the bit counter 14 in FIGURE 1 may be any suitable one of various known types. They may of the type illustrated and described in copending application Ser. No. 512,106 for Display System filed on Dec. 7, 1965 by John L. Botjer et al. and which is assigned to the assignee of this invention. Reference is made to that application, and the illustration and description therein are incorporated herein and made a part hereof.

Figure 9:
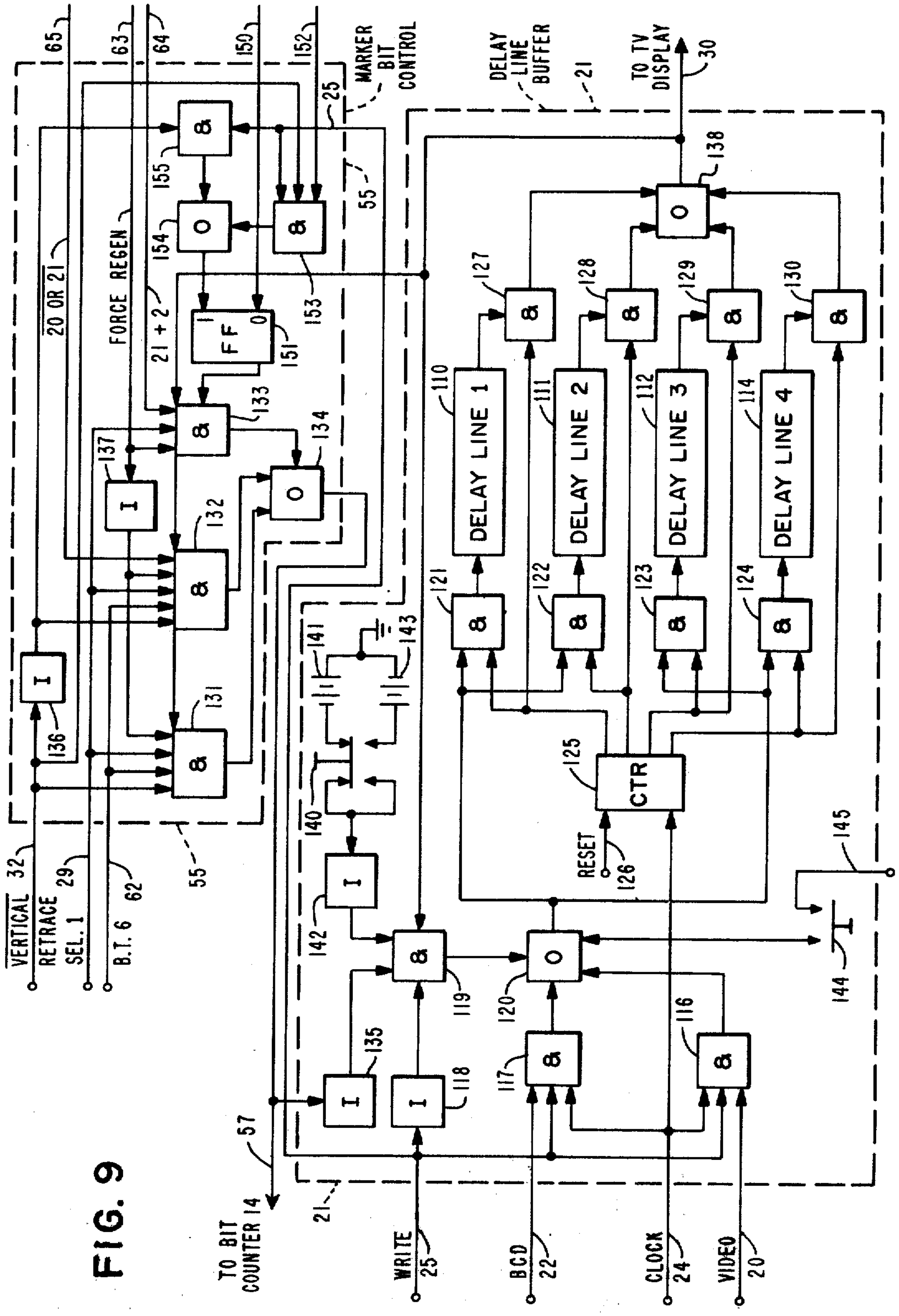
FIGURE 9 illustrates in detail the delay line buffer and the marker bit control shown in block form in FIGURE 1.

The delay line buffer 21 in FIGURE 1 may be any one of various known types, but it is preferably of the type illustrated in FIGURE 9. Reference is made next to FIGURE 9 for detailed illustration of the delay line buffer 21 and the marker bit control 55 which are shown in block form in FIGURE 1. The delay line buffer 21 includes And circuits 116 and 117 and an inverter 118 which are connected as shown to receive input signals from input lines 20, 22, 24, and 25. These logical circuits control the writing of new information into the delay lines 110 through 114. An And circuit 119 controls the re-entry of output data from the delay lines to the input thereof.

All information entered into the delay lines 110 through 114 passes through an Or circuit 120 to And circuits 121 through 124. Clock pulses on the line 24 in FIGURE 9 are coupled to the input of a counter 125. The counter is reset by a signal on a reset line 126. The counter 125 serves as a frequency divider, or commutating device, which applies clock pulses to the And circuits 121 through 124 in a repetitive sequence. Data signals to be written into the delay lines are supplied to all of the And circuits 121 through 124, and they are distributed to and stored in the various ones of the delay lines 110 through 114. The output signals from the delay lines are commutated by And circuits 127 through 130 to an Or circuit 138 the output of which is conveyed on the line 30 in FIGURE 9 to the And circuit 31 in FIGURE 1 and then to the TV display 33. The line 30 also supplies the output signals to the marker bit control 55 in FIGURE 9 and to the And circuit 119 for reinsertion in the delay lines whereby the information may be retained and repetitively presented to the TV display. It is pointed out that the And circuits 121 through 124 and respective And circuits 127 through 130 are commutated together by the outputs of the counter 125. The counter 125 in its most basic form may be simply a shift register in the form of a ring circuit. The ring circuit may be initially set to energize the And circuits 121 and 127. Thereafter, the ring circuit is driven by clock pulses to energize the four output lines in sequential fashion, thereby commutating information from the Or circuit 120 to the delay lines 110 through 114 in sequential fashion. For a further description of the delay line buffer 21 in FIGURE 8, reference is made to copending application Ser. No. 487,887 filed Sept. 16, 1965 entitled "Improved Delay Line Storage Circuit" by John L. Botjer et al. and which is assigned to the assignee of this invention.

When marker bits are stored, they are stored at bit time 6 in each of the blocks in FIGURE 2 where video or binary coded decimal information is stored. Prior to storing video or binary coded decimal information initial marker bits or synchronizing signals are stored in the last bit position of each block in FIGURE 2. This is bit 128 or time position 31.75 to 32.0 of each 32 microsecond block. The initial marker bit in each block is used to control the writing of information into the succeeding block in FIGURE 2. Each horizontal line for the TV display in FIGURE 5 has a video marker bit stored at bit time 6 of the last video byte written in the block in FIGURE 2. Initial marker bits are stored immediately preceding the point in time where each horizontal line sweep commences, and this point in time occurs at bit time 2. If video information is written into the adjacent subsequent block of the delay line buffer for display on a horizontal line of the TV display, the present marker bit is destroyed prior to the writing operation, and a new marker bit is inserted immediately at the end of the writing operation at bit time 6. All information stored in the delay line buffer 21 in FIGURE 9 is arbitrarily grouped into six-it bytes or twelve-bit bytes with the sixth bit or the twelfth bit in all instances being reserved for the marker bit which occurs at bit time 6. When the marker bit is destroyed prior to commencing a writing operation of a new byte, the sixth or twelfth bit of the preceding byte is left blank. For displayed video information this provides a space between adjacent charatcers. Whenever characters are displayed on the TV display, the marker bit appears immediately to the right of the character, and it serves as a cursor. It is especially useful when an operator has intentionally inserted several blank spaces since it permits him to see where the next typed character will be displayed. Thus it is seen that each block in FIGURE 2 is controlled by one, and only one, marker bit at any given time. The initial marker bit, disposed in the last bit position of the preceding block, is destroyed before video or binary coded decimal information is written, and the new marker bit is stored in bit position 6 of the new or last byte in a given block.

It was pointed out in FIGURE 2 that blocks KB1 through KB12 are employed to store binary or binary coded decimal (BCD) information. The BCD information is stored in twelve bit bytes in these registers, and a marker bit is disposed in the twelfth bit of the last byte in the block. The marker bit is stored at bit time 6 of the last BCD byte in a block. A given block may hold a maximum of ten BCD bytes of twelve bits each.

The marker bit control 55 in FIGURE 9 serves two functions. It destroys old marker bits, both video and BCD, prior to a writing operation and it locates the BCD marker bit during a reading operation. A BCD marker bit in a reading operation signifies that all BCD information has been read from the buffer registers KB1 . . . KB*n*, and reading should be terminated. The marker bit control 55 in FIGURE 9 inclues And circuits 131 through 133 which are connected to an Or circuit 134 the output of which is supplied on the line 57 through an inverter 135 to the And circuit 119 in the delay line buffer 21. When the output signal from the Or circuit 134 is a positive pulse, it signifies that the marker bit has been detected, and this signal serves to initiate operation of the bit counter 14 for writing purposes and to destroy the detected marker bit. That is, the positive pulse on the line 57 is inverted by the inverter 135 to a negative signal which deconditions the And circuit 119 and prevents reentry of the marker bit from the output to the input of the delay line buffer 21.

The And circuits 131 through 133 of the marker bit control 55 receive a select level on a line 29. A positive signal level is established on the line 29 whenever a key is depressed on the keyboard 10 in FIGURE 1. Otherwise a negative level is maintained on the line 29. When a positive level is established on the line 29 by depressing any key, this level persists for at least two cycles of the delay line during which time writing of the depressed character takes place in the delay line buffer 21 of video and BCD signals. The select line 29 is energized with a positive signal level when a key is depressed, and the keyboard is locked. The select line 29 is energized with a negative signal level when a keyboard is unlocked as described in copending application Ser. No. 512,106 referred to above. The And circuits 131 and 132 receive positive pulses at bit time 6 (B.T. 6) on the input line 62. Signal levels which control vertical retrace are supplied on the input line 32 to the And circuit 131, and this level is inverted by an inverter 136 and applied to the And circuit 132. The line 32 is energized with a negative signal during vertical retrace, thereby preventing energization of the And circuit 131 with an output signal which is positive at such time. The line 32 is energized with a positive signal level when information is displayed on the TV display, and this signal level is inverted by the inverter 123 and applied to the And circuit 132 as a negative signal level during such time, thereby preventing energization of this And circuit with an output signal level which is postitve during this time itnerval. Signal levels on the line 63 are 32 microsecond pulses which are alternately positive and negative. During the period of the positive pulses on the line 63, characters may not be displayed on the face of the T V display, and marker bits cannot be detected by the And circuits 131 and 132 because the inverter 137 supplies a negative signal level which deconditions these And circuits at such times. During the period of the negative pulses on the line 63, the TV display is unblanked except during vertical retrace, and the inverted levels from the inverter 137 energize the And circuits 131 and 132 with a postive signal level, thereby permitting them to detect marker bits. A positive pulse is supplied on the line 64 to the And circuit 133 during the last bit period of each block in FIGURE 2. This last bit occurs two bit periods after video byte 21. A positive signal level is supplied on the input line 65 to the And circuit 132 at all times except during bytes 20 and 21. Positive input pulses are applied on a line 150 at the beginning and the end of vertical retrace, and they reset a flip flop 151. A positive signal level appears on a line 152 during the seventh line of each character row, and it is applied to an And circuit 153. This And circuit receives signals on the line 25 and retrace control signals on the line 32. The output of the And circuit 153 is applied through an Or circuit 154 to the one input side of the flip flop 151. An And circuit 155 receives inputs from the line 25 and the inverted vertical retrace control signals from the inverter 136. The output of this And circuit is applied through the Or circuit 154 to the binary one input side of the flip flop 151. The binary zero output side of the flip flop 151 is applied to the And circuit 133. The And circuit 153 may be energized with a positive output signal only while video information is being displayed, and the And circuit 155 may be energized with a positive output signal only when vertical retrace takes place. The outputs of the And circuits 153 and 155 are supplied to the Or circuit 154, and is readily apparent that the output of the Or circuit 154 may set the flip flop 151 at any time during a picture frame cycle, including the display portions, the horizontal retrace portions, and the vertical retrace portion. Since the line 64 is energized with a positive pulse at bit time 2 at the end of a block, it is seen that the And circuit 133 may be opearted to detect only initial marker bits for both video and BCD information. Since the line 62 is energized with a positive pulse at bit time 6, the And circuits 131 and 132 may detect only those marker bits which have been written as the result of the insertion of keyboard characters into the delay line buffer 21 which character includes automatically the marker bit at bit time.

The signal level on the line 57 from the marker bit control 55 to the delay line buffer 21 is normally a negative signal level which is inverted by the inverter 135 and applied as a positive signal level to the And circuit 119, thereby permitting reentry into the delay lines of all output signals. When a positive signal pulse representing a marker bit is detected by the marker bit control 55, this positive signal level is changed at the output of the inverter 135 to a negative signal level which deconditions the And circuit 119 and inhibits the reentry of the marker bit into the delay line buffer. The period it takes a signal from the output of the delay lines 110 through 114 to pass through the Or circuit 138 along the conductor 30 through one of the And circuit 131 through 133, through the Or circuit 134 and through the inverter 135 to the And circuit 119 is made equal to or less than the time it takes the signal to pass from the Or circuit 128 through the And circuit 119. This timing relationship insures that all portions of the marker bit are destroyed. The space previously occupied by the marker bit is left bank; new information is inserted in the bit positions immediately thereafter; and a new marker bit is inserted in the sixth position prior to terminating the writing operation. A positive output pulse on the line 57 in FIGURE 9 is employed to operate the bit counter 14 in FIGURE 1 to initiate a writing operation of new information into the delay line buffer 21 as soon as a marker bit is detected, as explained in the above-mentioned copending application Ser. No. 512,106.

A cancel switch 140 in FIGURE 9 normally rests in the position shown and supplies a negative signal level from a source 141 to an inverter 142. The inverter thus supplies a positive level from its output to the And circuit 119, thereby conditioning this And circuit to premit reentry of signals from the delay lines. When the cancel switch 140 is depressed, it supplies a positive signal level from a source 143 to the inverter 142 which in turn supplies a negative signal level to the And circuit 119, thereby deconditioning this And circuit and preventing reentry of signals from the outputs of the delay lines to the inputs thereof. As a result all information signals in these delay lines are erased or destroyed as soon as one delay line cycle has been completed. When the cancel switch 140 is released, new signals may be stored in the delay lines. Initial marker bits or synchronizing signals are inserted initially in the delay lines prior to performing writing operations of video or BCD signals. As explained earlier one initial marker bit is inserted at the end of each horizontal line of the TV display. That is, one initial marker bit or synchronizing signal is inserted in each of the blocks in FIGURE 2, and it is inserted in the delay line buffer in the last bit position of each block. These initial marker bits are inserted by depressing a switch 144 in FIGURE 9 which is normally open as shown. This passes properly timed positive pulses representing marker bits from a line 145 to the Or circuit 120, and they are stored in the delay line buffer 21. The signals on the line 145 are derived from the horizontal and vertical timing control 54 in FIGURE 1, and they occur at bits time 2 after byte 21.

Figure 10:
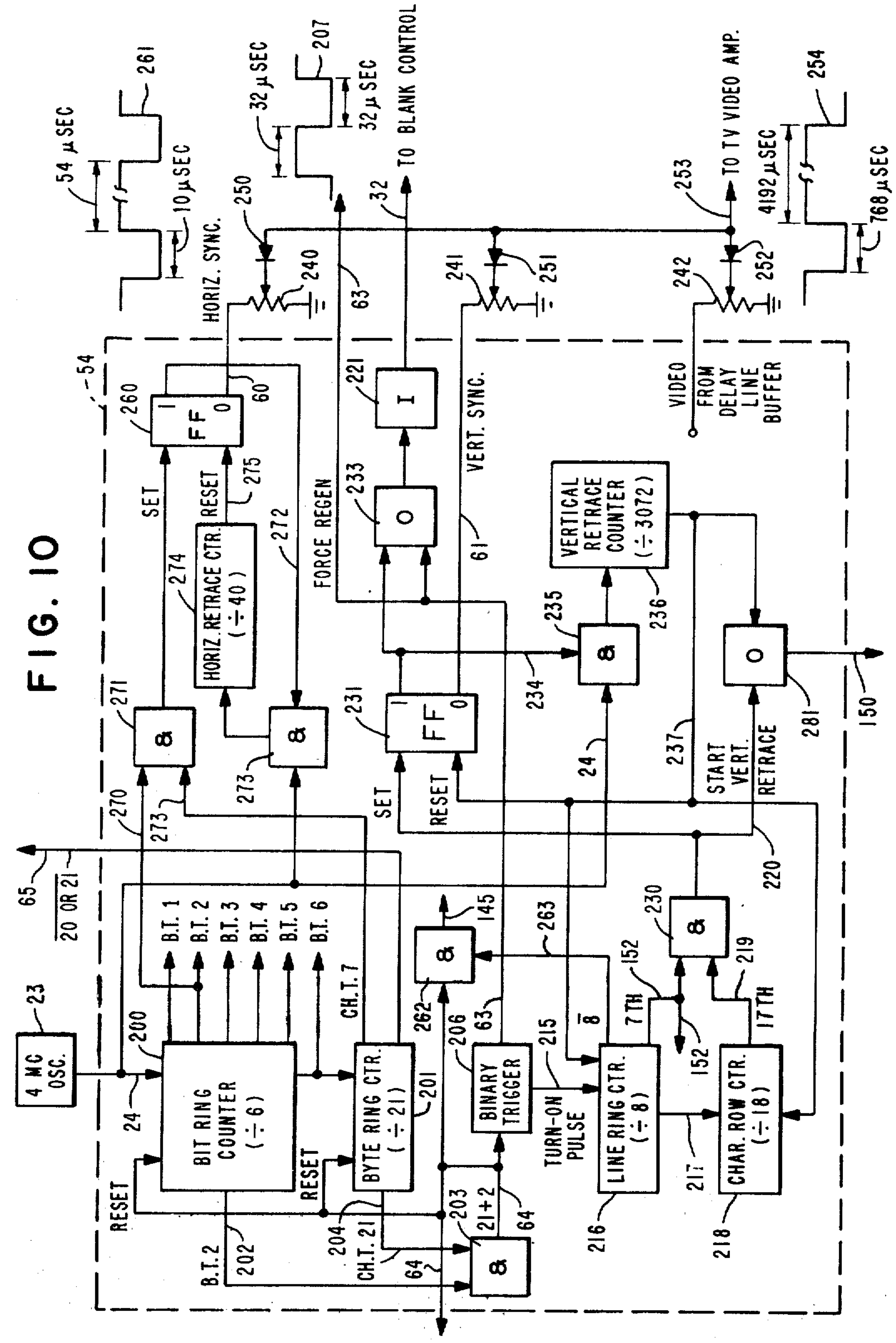
FIGURE 10 illustrates in detail the horizontal and vertical timing control shown in block form in FIGURE 1.

Reference is made to FIGURE 10 which illustrates in detail the horizontal and vertical timing control 54 in FIGURE 1. FIGURE 10 is a block diagram schematic of one manner in which timing pulses may be generated to operate the TV display 33 as well as the remainder of the system illustrated in FIGURE 1. The block 23 in FIGURE 10 is operated at 4 megacycles per second, thereby supplying pulses every 0.25 microsecond. Clock pulses are supplied on the line 24 to a bit ring counter 200 which may be a conventional six stage ring circuit that provides output pulses in sequential fashion to the lines labeled bit time (B.T.) 1 through 6. The bit time 6 pulse from each cycle of the bit ring counter 200 is supplied to and counted by a byte ring counter 201 which may be a 21 stage ring circuit. Pulses at bit time 2 are supplied on a line 202 from the bit ring counter 200 to an And circuit 203, and pulses are supplied at character time 21 from the byte ring counter 201 on a line 204 to the And circuit 203. The output of the And circuit 203 is supplied on the line 64 to the complement input of the binary trigger 206. As the line 64 is successively pulsed with positive signals, the binary trigger 206 alternates from one to the other of its stable states. The binary trigger 206 changes it state every 32 microseconds which is the time required to advance the byte ring counter 201 to a count of 21 bytes and the bit ring counter 200 through a count of 2 bits. The output signal on the line 63 from the binary trigger 206 is a series of pulses which are alternately plus and minus as indicated by the wave form 207. The output signal from the And circuit 203 on the line 64 is used to reset the bit ring counter 200 and the byte ring counter 201 after 21 bytes plus 2 bit times have been counted. The bit ring counter 200 supplies output pulses at the clock rate for each dot illustrated in the coordinate map of FIGURE 5. The byte ring counter 201 counts the number of bytes in a horizontal line which count also represents the maximum number of characters which may be displayed horizontally.

The binary trigger 206 has an output line 215 which is connected to a line ring counter 216 which may be an eight stage ring circuit. A full count of eight represents the total number of horizontal lines required to display a complete character. FIGURE 6 illustrates that eight horizontal lines are required to generate a complete character. When eight pulses have been received by the line ring counter 216 in FIGURE 10, it supplies a positive output signal on a line 217 to a character row counter 218 which may be an eighteen stage ring circuit. The full count of 18 represents the maximum number of rows of characters which may be displayed. FIGURE 6 illustrates that there are 18 horizontal rows of characters. When the character row counter 218 has counted 17 rows of characters and the line ring counter 216 has counted 7 lines of the next or eighteen character, positive signal levels are established simultaneously on respective output lines 219 and 152 to an And circuit 230, and this And circuit in turn supplies a positive output signal on a line 220 to an Or circuit 281 which passes this pulse on the line 150 to the zero input side of the flip flop 151 in FIGURE 9. The positive pulse from the And circuit 230 is used to set a flip flop 231 to the binary one state. This causes the binary zero output of the flip flop 231 to change to a negtive level, and this level is supplied along the conductor 61 to a resistor 241. The positive output level from the one output side of the flip flop 231 is supplied on a line 234 to an Or circuit 233 and then through an inverter 221 along the line 32 to the And circuit 31 in FIGURE 1, thereby deconditioning this And circuit and blocking the flow of video signals to the TV display 33. The positive output level on the one output side of the flip flop 231 also is supplied along the conductor 234 to condition an And circuit 235 to pass clock pulses on the line 24 to a vertical retrace counter 236. This counter must count 3072 pulses to provide a delay of 768 microseconds. Thus a counter, not a ring circuit, is employed because of the high count involved. A positive output pulse from the vertical retrace counter 236 is supplied on a line 237 to the binary zero input side of the flip flop 231, thereby resetting this flip flop. When reset to the zero state, the flip flop 231 causes a positive signal to be established on the line 32 to the And circuit 31 in FIGURE 1, thereby conditioning this And circuit to pass video signals to the TV display 33 as soon as vertical retrace has ended. The positive pulse on the line 237 from the vertical retrace counter is applied through the Or circuit 281 to the line 150 which in turn is connected to the zero input side of the flip flop 151 in FIGURE 9, thereby resetting this flip flop at the end of vertical retrace.

The TV display includes a set of resistors 240 through 242 connected as shown through respective diodes 250 through 252 to an output line 253. Horizontal synchronization signals, vertical synchronization signals, and video signals are combined to form a composite signal on the output line 253 to the video amplifier of the TV display. The TV display 33 in FIGURE 1 receives retrace, horizontal and vertical control signals on respective lines 32, 60 and 61 from the horizontal and vertical timing control 54 in FIGURE 10. The TV display 33 in FIGURE 1 is preferably a television set, and may be any one of numerous television sets which are commercially available. The composite signal on the line 253 in FIGURE 10 is injected in the TV set at the point where the output of the detector normally feeds the TV video amplifier, and it may be advisable to disconnect the detector from the video amplifier before injecting the composite signal. This is a precaution to protect the diode detector. The vertical size control and the horizontal size control of a commercial television set may be adjusted to vary the size of the television display. It may be necessary in some instance to change the potentiometers in the vertical and the horizontal size control circuits in order to obtain additional range.

Video signals from the delay line buffer 21 in FIGURE 1 are supplied to the resistor 242 in FIGURE 10 for the purpose of developing the composite signal supplied to the TV video amplifier. Signals taken from the zero output side of the flip-flop 231 in FIGURE 10 are supplied on the line 61 to the resistor 241, and the signal supplied to the resistor 241 are a sequence of negative and positive pulses with the negative pulses being 768 microseconds in duration and the positive pulses being 4192 microseconds in duration as illustrated by the wave form 254 in FIGURE 10. Horizontal synchronization signals are taken from the zero output side of a flip flop 260 and applied on the ilne 60 to the resistor 240. The horizontal synchronization signals are positive and negative pulses with the negative pulses being 10 microseconds in duration and the positive pulses being 54 microseconds in duration as illustrated by the wave form 261 in FIGURE 10.

Initial marker pulses for insertion in the delay line buffer are supplied by an And circuit 262 to the line 145 in FIGURE 10, and these pulses are supplied to the contacts of the switch 144 in FIGURE 9 for insertion in the delay line buffer 21 in the manner previously explained. The marker pulses are positive pulses which are generated for each block in FIGURE 2 or each line in FIGURE 6 except the eighth line in each character, and they occur at the last bit time in each line. More specifically, the line counter 216 in FIGURE 10 supplies a positive signal level on a line 263 to the And circuit 262 at all times except during the eighth line, and it is recalled that the eighth line is left blank to provide vertical spacing between rows of characters. The And circuit 203 supplies a positive signal on the line 64 to the And circuit 262 during the last bit period of each line. The marker bit in one block in FIGURE 2 may be detected and utilized for synchronization purposes in a succeeding block. Timewise, an initial marker bit disposed at the end of one 32 microsecond block in FIGURE 8A signifies the commencemetn of the succeeding 32 microsecond block. This is illustrated by the initial marker pulses 81 and 82 in FIGURE 8B.

The bit ring counter 200 supplies a positive signal on an output line 270 at bit 2 time to an And circuit 271 in FIGURE 10, and the byte ring counter 201 supplies a positive signal on an output line 273 to the And circuit 271 at character time 7. The And circuit 271 in turn supplies a positive pulse to the binary one input side of the flip flop 260, thereby setting this flip flop to the one state and providing a positive output signal on a line 272 to an And circuit 273. The And circuit 273 is thereby conditioned to pass clock pulses on the line 24 to a horizontal retrace counter 274 which may be a ring counter having 40 stages. When 40 pulses have been received by the horizontal retrace counter 274, a positive output signal is supplied on a line 275 to the binary zero input side of the flip flop 260, thereby resetting the flip flop 260 to the binary zero state. This causes the one output level on the line 272 to change from a positive to a negative level, thereby deconditioning the And circuit 273 and inhibiting the passage of further clock pulses. The binary zero output of the flip flop 260 changes from a negative level to a positive level, and this level is applied on the line 60 to the resistor 240. It is seen therefore that the horizontal synchronization signals supplied by the flip flop 260 to the resistor 240 are positive and negative levels with the negative level having a duration of 10 microseconds and the positive level having a duration of 54 microseconds as illustrated by the wave form 261 in FIGURE 10. The horizontal synchronization levels are combined with the vertical synchronization signals and the video signals to form a composite signal on the output line 253 to the TV video amplifier.

The operation of the apparatus according to this invention is described next. After the equipment has been energized, the switch 140 in FIGURE 9 is depressed, and this clears the delay lines 1 through 4. Next the switch 144 in FIGURE 9 is depressed and initial marker bits or synchronizing signals are inserted in the delay line buffer every 32 microseconds. These signals define the blocks of the delay line buffer illustrated in FIGURE 2, and they are disposed at the last bit position of each block which is byte time 21 and bit time 2 of each block. When the first key of the keyboard 10 is depressed, binary signals are supplied in parallel on the cable 11 to the composer 12 and the parallel-serial converter 13 in FIGURE 1. As described in the above-mentioned copending application, the select line 29 is energized with a positive signal at the start of vertical retrace if a key is depressed on the keyboard. Thus the line 29 is energized with a positive signal at the beginning of block 66 in FIGURE 2 when a key is depressed. The video signals from the composer include seven bytes of six bits each which are stored in the first byte position of blocks 1 through 7 in FIGURE 2. The video information is displayed in the first byte of lines 1 through 7 in FIG- URE 5, and the character represented by such video information appears in the five-by-seven matrix in the upper left hand corner of the TV display in FIGURE 6. As soon as the marker bit control 55 in FIGURE 1 locates the initial marker bit which controls writing in block 1 of the delay line buffer in FIGURE 2, it sends a positive pulse on the line 57 in FIGURE 1 to the bit counter 14, and the bit counter 14 in turn operates the composer 12 to supply the video information to the delay line buffer 21 for insertion therein, as explained in the above-mentioned copending application 512,106. The positive pulse on the line 57 in FIGURE 1, for initiating a writing operation, is generated by the And circuit 133 in the marker bit control 55 in FIGURE 9. The inputs to this And circuit are discussed next.

The line 29 in FIGURE 9 is energized with a positive signal whenever any key on the keyboard 10 is depressed. Synchronizing signals from the delay line buffer 21 are supplied on the line 30 to the And circuit 133 at byte time 21 and bit time 2 for each block shown in FIGURE 2 prior to the first writing operation. This synchronizing signal or initial marker bit for each block is destroyed whenever information is written into the associated block of the delay line buffer. Since it is assumed that no writing operation has taken place yet, these initial marker bits in the form of positive signals are supplied on the line 30 to the AND circuit 133 for each block of the delay line buffer 21. The line 64 in FIGURE 9 is energized with a positive pulse at byte time 21 and bit time 2 for each block of the delay line buffer, and this positive signal is generated for each block of the delay line buffer whether or not writing operations have taken place. The line 63 in FIGURE 9 is energized with a sequence of positive and negative pulses each of which is 32 microseconds in duration. When the force regeneration line 63 is positive, the display on the face of the TV tube 33 in FIGURE 1 is blanked. In this connection it is pointed out that the positive signal on the line 63 in FIGURE 10 is supplied through the Or circuit 233 to the inverter 221, and the output signal from the inverter on the line 32 to the And circuit 31 in FIGURE 1 has a polarity opposite to that on the line 63 in FIGURE 9. The control signal on the line 63 in FIGURE 9 insures that writing may take place in alternate blocks during one cycle and that writing may take place in the remaining alternate blocks during the next cycle of the delay line buffer. The flip flop 151 in FIGURE 9 is reset to the zero state by a positive pulse on the line 150 and the resultant positive output signal from the zero output side is supplied to the And circuit 133. Positive signal pulses are supplied to the line 150 in FIGURE 9 at the beginning and the end of vertical retrace. In this connection note that the Or circuit 281 in FIGURE 10 is energized with a positive signal from the And circuit 230 upon the start of vertical retrace and by positive signal from the vertical retrace counter 236 at the end of vertical retrace. If each of the input lines to the And circuit 133 in FIGURE 9 are energized with a positive signal, this And circuit supplies a positive signal which passes through the Or circuit 134 and along the conductor 157 to the bit counter 14 in FIGURE 1, thereby initiating a writing operation. When information is written into the delay line buffer 21, the write line 25 is energized with a positive signal during the period the writing operation takes place, and the positive signal on the line 25 is supplied to the And circuits 153 and 155. The first video byte is inserted in the first byte position of block 1 of the delay line buffer, and the second through the seventh video bytes are inserted in the first byte positions of blocks 2 through 7 in FIGURE 2. The And circuit 133 detects the initial marker bits at byte time 21 and bit time 2 in blocks 78 through 84, and each initiates a writing operation in respective blocks 2 through 7 before it is destroyed. A new marker bit is inserted by the writing operation in bit 6 of each video byte.

The BCD information representative of the first depressed key is stored in block KB 1 of the delay line buffer in FIGURE 2. The BCD bytes are 12 bits in length, and they are written in bytes 1 and 2 of the block KB1. A BCD marker bit is written in bit 12 of a BCD byte, and it occurs at bit time 6. The And circuit 133 has all of its inputs energized with positive signals at byte time 21 and bit time 2 of block 66 in FIGURE 2. Thus a positive pulse is supplied by the And circuit 133 which is passed through the Or circuit 134 and along the line 57 to initiate a BCD writing operation in byte locations 1 and 2 of block KB1. As soon as a BCD writing operation is initiated, the write line 25 is energized with a positive signal, and this positive signal is supplied to the And circuit 155. The output of the inverter 136 is a positive signal during vertical retrace, and this positive signal is supplied to the And circuit 155. Accordingly, the And circuit 155 supplies a positive signal through the Or circuit 154 to the one input side of the flip flop 151, thereby setting this flip flop. Accordingly, the zero output of this flip flop changes from a positive to a negative signal level, and the negative signal level deconditions the And circuit 133, preventing further BCD writing operations during this cycle of the delay line buffer in FIGURE 9. The And circuit 153 in FIGURE 9 is energized with positive input signals when the initial marker bit has been detected for a writing operation in the seventh line of a video write operation, and the And circuit 153 supplies a positive signal through the Or circuit 154 to the one input side of the flip flop 151, thereby establishing a negative signal level on the zero output side thereof which deconditions the And circuit 133 and prevents further video writing operations during the given cycle of the delay line buffer in FIGURE 9. As soon as video and BCD information has been written in response to the depression of a key on the keyboard, the keyboard is unlocked, and the signal level on the line 29 in FIGURE 9 changes from a positive level to a negative level, thereby deconditioning the And circuits 131 through 133 and preventing the further detection of marker bits until another key is depressed. It is recalled that the keyboard is locked as soon as video and BCD information is written in response to the depressed key, the keyboard is unlocked. Thus it is seen how the first character is written into the delay line buffer 21 in FIGURE 9. This character is repetitively displayed on the face of the TV display during each picture frame cycle thereafter.

As the second and subsequent character keys are depressed at the keyboard, additional video and BCD writing operations take place in the same manner described above the exception that the And circuits 131 and 132 in FIGURE 9 are employed to detect the marker bits which occur at bit time 6 of the last video or BCD byte. The And circuit 131 detects video marker bits which occur at bit time 6, and the And circuit 132 detects BCD marker bits which occur at bit time 6. The And circuit 131 detects a video marker bit when positive input signals are simultaneously supplied on its input lines 29, 30, 32, 62 and the input taken from the inverter 137. The And circuit 132 detects a BCD marker bit when positive signals are simultaneously supplied on its input lines 29, 30, 62, 65, and the inputs taken from the inverters 136 and 137. The positive output pulses from the And circuits 131 and 132 cause old BCD and video marker bits to be destroyed and a writing operation to be initiated. Video and BCD information is written into the delay line buffer 21 in FIGURE 9 for successively typed characters, and these characters are displayed next to each other, proceeding from left to right, in the first character row in FIGURE 6. This character row is the uppermost character row in FIGURE 6. When 21 characters have been typed, stored and displayed, the upper character row in FIGURE 6 is full, and the next character is written in the first character cell of the second character row in FIGURE 6. The video information for this character is stored in the first byte position of blocks 9 through 15 of FIGURE 2. Characters are written from left to right in the second character row in FIGURE 6, and as additional keys are depressed, additional characters are written in the succeeding character rows in FIGURE 6. It is pointed out that there is not sufficient storage capacity in storage blocks KB1 through KB12 to store as many BCD bytes as there are video bytes stored in blocks 1 through 143 in FIGURE 2. The keyboard may be operated to store and display video and BCD information for 120 characters. The remaining storage space may be used to store and display video information taken from a different input device, not shown, such as a data processing system, for example. Information may be extracted during vertical retrace from the blocks KB1 through KB12 and supplied to a load device, not shown, such as a data processing system. For further information on this aspect reference should be made to the above mentioned copending application Ser. No. 512,106 and copending application Ser. No. 517,334 filed Dec. 29, 1965 by John L. Botjer et al. for "Display Device with Synchronized Video and BCD Data in a Cyclical Storage" and assigned to the assignee of this invention.

Thus it is seen from the foregoing description that a novel display arrangement is provided wherein video information for each line of a TV display is stored in blocks in a recirculating storage device, and the blocks of video signals are interleaved in the recirculating buffer storage device. Video signals for the upper portion of the TV display are retrieved in one pass through the recirculating storage device, and video signals for the lower portion of the TV display are retrieved in the second pass through the recirculating storage device. The horizontal blanked time is equal in duration to the unblanked time of the video display. Consequently, video information not displayed in the first pass or cycle of the recirculating buffer storage device occurs in the retrace portions of the upper part of the TV display, and video information not displayed in the second cycle of the recirculating buffer storage device occurs in the retrace portions of the lower part of the TV display. This results in the maximum utilization of the available storage in the recirculating buffer storage device since all information stored in the recirculating buffer storage device is displayed on the first or the second cycles or passes except one-half of the available space in the vertical retrace portion of each TV frame, and this storage capacity is used to store keyboard data in the form of binary digital signals. The invention is comparatively simple in construction, and accordingly it is correspondingly inexpensive to manufacture and maintain. Moreover, it is adaptable to many and varied uses.

While the invention has been particularly shown and described with reference to a preferred embodiment thereof, it will be understood by those skilled in the art that various changes in form and details may be made therein without departing from the spirit and scope of the invention.

What is claimed is:

1. A display system utilizing interleaved buffer storage for obtaining optimum use of available storage comprising:

display tracing apparatus charatcterized by generation of a continuously viewable image by an intensity-modulation trace in a predetermined cyclic sweep pattern across an area of a display surface; said sweep pattern including a predetermined unblanked phase during which an image is formed and a predetermined blanked phase during which intensity modulation is held at a blank level, the blanked phase being equal in duration to the unblanked phase;

cyclic buffer storage means coupled to the display tracing apparatus for directly controlling the image produced by the trace in response to stored intensity modulation information; the cyclic buffer storage means having a cycle period which is a submultiple of the trace period and having a separate storage section for each line segment of the trace, each separate stroage section having a duration equal to the blanked phase of said sweep pattern of the display trace apparatus; and control means coupled to the display tracing apparatus and the cyclic buffer storage means for displaying alternate ones of the separate storage sections of the cyclic buffer storage means in each of its cycles, one-half of the separate storage sections being presented for display in one cycle of the cyclic buffer sorage means and the remaining separate storage sections being presented for display in the subsequent cycle of the cyclic buffer storage means, and said control means including further means to synchronize the separate storage sections of the cyclic buffer storage means with the unblanked phase and the blanked phase of the display tracing apparatus.

2. The apparatus of claim 1 wherein the cyclic buffer storage means has four delay lines operated in parallel wiht switching means for sequentially supplying signals to the inputs thereof and extracting signals sequentially from the output thereof, and feedback means for selectively coupling the output to the input through the switching means; and the display tracing apparatus is a television type display device.

3. A display system utilizing interleaved buffer storage for increased efficiency comprising:

display tracing apparatus which generates a continuously viewable image by an intensity-modulated trace in a predetermined cyclic sweep pattern of lines across an area of a display surface, the trace including a predetermined unblanked phase during which an image is formed and a predetermined blanked phase during which intensity modulation is held at a blanked level, the unblanked phase and the blanked phase being of equal time duration with the number of unblanked phase segments being an odd integer;

cyclic buffer storage maens coupled to the display tracing apparatus for directly controlling the image produced by the trace with stored intensity modulation information;

the cyclic buffer storage means having an effective cycle which is one-half of the total cycle of the display tracing apparatus, whereby in one cycle of the cyclic buffer storage means a part of the viewable trace is generated by the display tracing apparatus in response to intensity modulation information stored in alternate time sections of the cyclic buffer storage means and in the next cycle of the cyclic buffer storage means the remainder of the viewable trace is generated by the display tracing apparatus in response to intensity modulation information stored in the remaining alternate sections of the cyclic buffer storage means; and said display system including control means coupled to the display tracing apparatus and the cyclic buffer storage means, said control means serving to unblank said display tracing apparatus and display during each line trace intensity modulation information stored in the alternate sections of the cyclic buffer storage means and to blank said display for line retrace during said remaining alternate sections in one complete cycle of said cyclic buffer storage means; and said control means further serving to unblank said display tracing apparatus and display during each line trace information stored in said remaining alternate sections of the cyclic buffer storage means and to blank said display for line retrace during said alternate sections in the next cycle of the cyclic buffer storage means.

4. The apparatus of claim 3 wherein the cyclic buffer storage means has four delay lines operated in parallel with switching means for sequentially supplying signals to the inputs thereof and extracting signals sequentially from the output thereof, and feedback means for selectively coupling the output to the input through the switching means; and the display tracing apparatus is a television type display device.

References Cited

UNITED STATES PATENTS 3,307,156 2/1967 Durr ------------ 340—172.5

ROBERT L. GRIFFIN, Primary Examiner

B. LEIBOWITZ, Assistant Examiner

U.S. Cl. X.R.

340—172.5, 324.1